(12) United States Patent
Ohno

(10) Patent No.: US 8,223,212 B2
(45) Date of Patent: Jul. 17, 2012

(54) HAND MOVEMENT CORRECTION APPARATUS, MEDIUM STORING HAND MOVEMENT CORRECTION PROGRAM, IMAGE PICKUP APPARATUS, AND MEDIUM STORING IMAGE PICKUP PROGRAM

(75) Inventor: Toshiyuki Ohno, Tokyo (JP)

(73) Assignees: Kabushiki Kaisha Toshiba, Tokyo (JP); Toshiba Solutions Corporation, Tokyo (JP)

( * ) Notice: Subject to any disclaimer, the term of this patent is extended or adjusted under 35 U.S.C. 154(b) by 414 days.

(21) Appl. No.: 12/341,901

(22) Filed: Dec. 22, 2008

(65) Prior Publication Data

US 2009/0167879 A1 Jul. 2, 2009

(30) Foreign Application Priority Data

Dec. 26, 2007 (JP) ................................ 2007-334600

(51) Int. Cl.
*H04N 5/228* (2006.01)
(52) U.S. Cl. ............. 348/208.12; 348/208.7; 348/208.1; 348/208.2
(58) Field of Classification Search ............. 348/208.99, 348/208.1, 208.2, 208.4
See application file for complete search history.

(56) References Cited

U.S. PATENT DOCUMENTS

| | | | | |
|---|---|---|---|---|
| 5,608,703 | A * | 3/1997 | Washisu | 348/208.7 |
| 6,801,247 | B1 * | 10/2004 | Ohishi et al. | 348/208.1 |
| 7,668,447 | B2 * | 2/2010 | Yamazaki | 396/55 |
| 7,791,643 | B2 * | 9/2010 | Stavely | 348/208.2 |
| 2005/0071394 | A1 * | 3/2005 | Martyn et al. | 707/205 |

FOREIGN PATENT DOCUMENTS

| | | |
|---|---|---|
| JP | 07-203285 | 8/1995 |
| JP | 11-218795 | 8/1999 |
| JP | 2001-209084 | 8/2001 |
| JP | 2005-043625 | 2/2005 |
| JP | 2007-329874 | 12/2007 |

OTHER PUBLICATIONS

Japanese Office Action for 2007-334600 mailed on Jun. 29, 2010.

* cited by examiner

*Primary Examiner* — Jason Chan
*Assistant Examiner* — Abdelaaziz Tissire
(74) *Attorney, Agent, or Firm* — Turocy & Watson, LLP

(57) ABSTRACT

The hand movement correction apparatus 10 which is capable of correcting hand movement includes: a position variation signal acquisition sections 13 and 17 that acquire a position variation signal; a gain controller 12 that controls the gain of the position variation signal; an exposure determination section 14 that determines whether exposure operation is in progress; a position variation signal switching section 14 that switches the position variation signal; and a hand movement amount calculation section 15 that calculates a hand movement correction amount based on the position variation signal.

8 Claims, 4 Drawing Sheets

HAND MOVEMENT CORRECTION APPARATUS, MEDIUM STORING HAND MOVEMENT CORRECTION PROGRAM, IMAGE PICKUP APPARATUS, AND MEDIUM STORING IMAGE PICKUP PROGRAM

BACKGROUND OF THE INVENTION

1. Field of the Invention

The present invention relates to a technique for correcting hand movement during image pickup operation.

2. Description of the Related Art

As a hand movement correction method for correcting hand movement occurring in a process of taking still or moving pictures by making use of an image pickup apparatus, there is known a method (shift lens system) that uses a shift lens serving as a kind of an optical hand movement correction means. The shift lens system is a hand movement correction system that utilizes light refraction. That is, the shift lens system detects the movement of an image pickup apparatus by making use of an angular speed sensor or the like provided therein and drives a shift lens in the direction canceling the movement (positional shift amount of light with respect to an image pickup device) detected by the angular speed sensor during a time period between the start and end of exposure operation to correct the optical axis of the lens, whereby the light reaches an original target point. Thus, the correction range in the shift lens system is restricted by the movable range of the shift lens, so that correction needs to be made such that the correction range falls within the movable range of the shift lens.

In the case where the detected movement of the image pickup apparatus is not due to unintentional hand movement but a photographer's intentional hand movement (pan/tilt), the movement may far exceed the correction range, generating strong unnatural feeling (large shake) in the finder image. As a method for reducing the strong unnatural feeling, there is known a technique that controls a correction gain by performing initialization of an input value from the angular speed sensor, position output value after integration, and integration calculation so as to temporarily restrict the correction operation (refer to, e.g., Patent Document 1: Jpn. Pat. Appln. Laid-Open Publication No. 2001-209084).

As described above, in the technique disclosed in Patent Document 1, in order to restore the original correction operation, correction control such as temporarily stopping the hand movement correction or reducing the correction gain according to a predetermined time constant is required, and such correction control requires a certain time. If still image pickup operation is performed during the correction control, desired correction is hardly applied to image data, with the result that obtained image is blurred.

SUMMARY OF THE INVENTION

The present invention has been made to solve the above problem, and an object thereof is to provide a hand movement correction apparatus, a medium storing a hand movement correction program, an image pickup apparatus, and a medium storing an image pickup program which are capable of correcting hand movement in both still image and moving image pickup operation.

To solve the above problem, according to a first aspect of the present invention, there is provided a hand movement correction apparatus for correcting hand movement in an image pickup apparatus, including: a position variation signal acquisition section that acquires a position variation signal representing the movement of the image pickup apparatus; a gain controller that controls the gain of the position variation signal acquired by the position variation signal acquisition section according to a predetermined time constant; an exposure determination section that determines whether exposure operation is in progress in the image pickup apparatus; a position variation signal switching section that switches the position variation signal that has been subjected to gain control by the gain controller to the position variation signal acquired by the position variation signal acquisition section for output in the case where it has been determined by the exposure determination section that the exposure operation is in progress in the image pickup apparatus; and a hand movement amount calculation section that calculates a hand movement correction amount based on the position variation signal output from the position variation signal switching section.

The hand movement correction apparatus according to the first aspect of the present invention further includes: an offset value calculation section that outputs, as an offset value, a value obtained by subtracting the value of the position variation signal that has been subjected to gain control by the gain controller at the start timing of exposure in the image pickup apparatus determined by the exposure determination section from the value of the position variation signal acquired by the position variation signal acquisition section at the exposure start timing, wherein in the case where it has been determined by the exposure determination section that the exposure operation is in progress in the image pickup apparatus, the hand movement correction amount calculation section calculates the hand movement correction amount based on a position variation signal obtained by subtracting the offset value output from the offset value calculation section from the position variation signal output from the position variation signal switching section.

Further, in the hand movement correction apparatus according to the first aspect of the present invention, the gain controller controls the gain of the position variation signal acquired by the position variation signal acquisition section according to a predetermined time constant such that the value of the position variation signal falls within an allowable range set in the hand movement correction amount calculation section.

Further, in the hand movement correction apparatus according to the first aspect of the present invention, when controlling the gain of the position variation signal acquired by the position variation signal acquisition section to a value more than a predetermined gain value, the gain controller outputs, to the image pickup apparatus, a correction signal representing that hand movement correction is being performed.

According to a second aspect of the present invention, there is provided a medium storing, in a computer readable manner, a hand movement correction program for correcting hand movement in an image pickup apparatus. The hand movement correction program allows a computer to execute: a position variation signal acquisition step that acquires a position variation signal representing the movement of the image pickup apparatus; a gain control step that controls the gain of the position variation signal acquired by the position variation signal acquisition step according to a predetermined time constant; an exposure determination step that determines whether exposure operation is in progress in the image pickup apparatus; a position variation signal switching step that switches the position variation signal that has been subjected to gain control by the gain control step to the position variation signal acquired by the position variation signal acquisition step for output in the case where it has been determined by the exposure determination step that the exposure operation is in progress in the image pickup apparatus; and a hand movement amount calculation step that calculates a hand movement correction amount based on the position variation signal output from the position variation signal switching step.

In the medium according to the second aspect of the present invention, the hand movement correction program further allows the computer to execute: an offset value calculation step that outputs, as an offset value, a value obtained by subtracting the value of the position variation signal that has been subjected to gain control by the gain control step at the start timing of exposure in the image pickup apparatus determined by the exposure determination step from the value of the position variation signal acquired by the position variation signal acquisition step at the exposure start timing, and in the case where it has been determined by the exposure determination step that the exposure operation is in progress in the image pickup apparatus, the hand movement correction amount calculation step calculates the hand movement correction amount based on a position variation signal obtained by subtracting the offset value output by the offset value calculation step from the position variation signal output by the position variation signal switching step.

In the medium according to the second aspect of the present invention, the gain control step controls the gain of the position variation signal acquired by the position variation signal acquisition step according to a predetermined time constant such that the value of the position variation signal falls within an allowable range set in the hand movement correction amount calculation step.

In the medium according to the second aspect of the present invention, when controlling the gain of the position variation signal acquired by the position variation signal acquisition step to a value more than a predetermined gain value, the gain control step outputs, to the image pickup apparatus, a correction signal representing that hand movement correction is being performed.

According to a third aspect of the present invention, there is provided an image pickup apparatus that performs correction of hand movement, including: an image pickup device; an optical system that guides light to the image pickup device; a position variation signal acquisition section that acquires a position variation signal representing the movement of the image pickup apparatus; a gain controller that controls the gain of the position variation signal acquired by the position variation signal acquisition section according to a predetermined time constant; an exposure determination section that determines whether exposure operation is in progress in the image pickup apparatus; a position variation signal switching section that switches the position variation signal that has been subjected to gain control by the gain controller to the position variation signal acquired by the position variation signal acquisition section for output in the case where it has been determined by the exposure determination section that the exposure operation is in progress in the image pickup apparatus; a hand movement amount calculation section that calculates a hand movement correction amount based on the position variation signal output from the position variation signal switching section; and a drive section that drives at least one of the optical system and image pickup device based on the hand movement correction amount calculated by the hand movement correction amount calculation section.

The image pickup apparatus according to the third aspect of the present invention further includes: an offset value calculation section that outputs, as an offset value, a value obtained by subtracting the value of the position variation signal that has been subjected to gain control by the gain controller at the start timing of exposure in the image pickup apparatus determined by the exposure determination section from the value of the position variation signal acquired by the position variation signal acquisition section at the exposure start timing, wherein in the case where it has been determined by the exposure determination section that the exposure operation is in progress in the image pickup apparatus, the hand movement correction amount calculation section calculates the hand movement correction amount based on a position variation signal obtained by subtracting the offset value output from the offset value calculation section from the position variation signal output from the position variation signal switching section.

Further, in the image pickup apparatus according to the third aspect of the present invention, the gain controller controls the gain of the position variation signal acquired by the position variation signal acquisition section according to a predetermined time constant such that the value of the position variation signal falls within an allowable range set in the hand movement correction amount calculation section.

Further, in the image pickup apparatus according to the third aspect of the present invention, when controlling the gain of the position variation signal acquired by the position variation signal acquisition section to a value more than a predetermined gain value, the gain controller outputs a correction signal, and the image pickup apparatus further includes a finder for displaying an image obtained by the image pickup device and a hand movement correction display section that displays, based on the correction signal, information indicating that hand movement correction is being performed on the finder.

According to a fourth aspect of the present invention, there is provided a medium storing, in a computer readable manner, an image pickup program for correcting hand movement in an image pickup apparatus provided with an image pickup device and an optical system that guides light to the image pickup device. The image pickup program allows a computer to execute: a position variation signal acquisition step that acquires a position variation signal representing the movement of the image pickup apparatus; a gain control step that controls the gain of the position variation signal acquired by the position variation signal acquisition step according to a predetermined time constant; an exposure determination step that determines whether exposure operation is in progress in the image pickup apparatus; a position variation signal switching step that switches the position variation signal that has been subjected to gain control by the gain control step to the position variation signal acquired by the position variation signal acquisition step for output in the case where it has been determined by the exposure determination step that the exposure operation is in progress in the image pickup apparatus; a hand movement amount calculation step that calculates a hand movement correction amount based on the position variation signal output from the position variation signal switching step; and a drive step that drives at least one of the optical system and image pickup device based on the hand movement correction amount calculated by the hand movement correction amount calculation step.

In the medium according to the fourth aspect of the present invention, the image pickup program further allows the computer to execute: an offset value calculation step that outputs, as an offset value, a value obtained by subtracting the value of the position variation signal that has been subjected to gain control by the gain control step at the start timing of exposure in the image pickup apparatus determined by the exposure determination step from the value of the position variation signal acquired by the position variation signal acquisition step at the exposure start timing, and in the case where it has been determined by the exposure determination step that the exposure operation is in progress in the image pickup apparatus, the hand movement correction amount calculation step calculates the hand movement correction amount based on a position variation signal obtained by subtracting the offset value output by the offset value calculation step from the position variation signal output by the position variation signal switching step.

In the medium according to the fourth aspect of the present invention, the gain control step controls the gain of the position variation signal acquired by the position variation signal acquisition step according to a predetermined time constant such that the value of the position variation signal falls within an allowable range set in the hand movement correction amount calculation step.

In the medium according to the fourth aspect of the present invention, the image pickup apparatus further includes a finder for displaying an image obtained by the image pickup device, the gain control step outputs a correction signal when controlling the gain of the position variation signal to a value more than a predetermined gain value, and the image pickup program further allows the computer to execute a hand movement correction display step that displays, based on the correction signal, information indicating that hand movement correction is being performed on the finder.

As described above in detail, according to the present invention, there can be provided a hand movement correction apparatus, a medium storing a hand movement correction program, an image pickup apparatus, and a medium storing an image pickup program which are capable of correcting hand movement in both still image and moving image pickup operation.

DETAILED DESCRIPTION OF THE PREFERRED EMBODIMENTS

An embodiment of the present invention will be described below with reference to the accompanying drawings.

Figure 1:
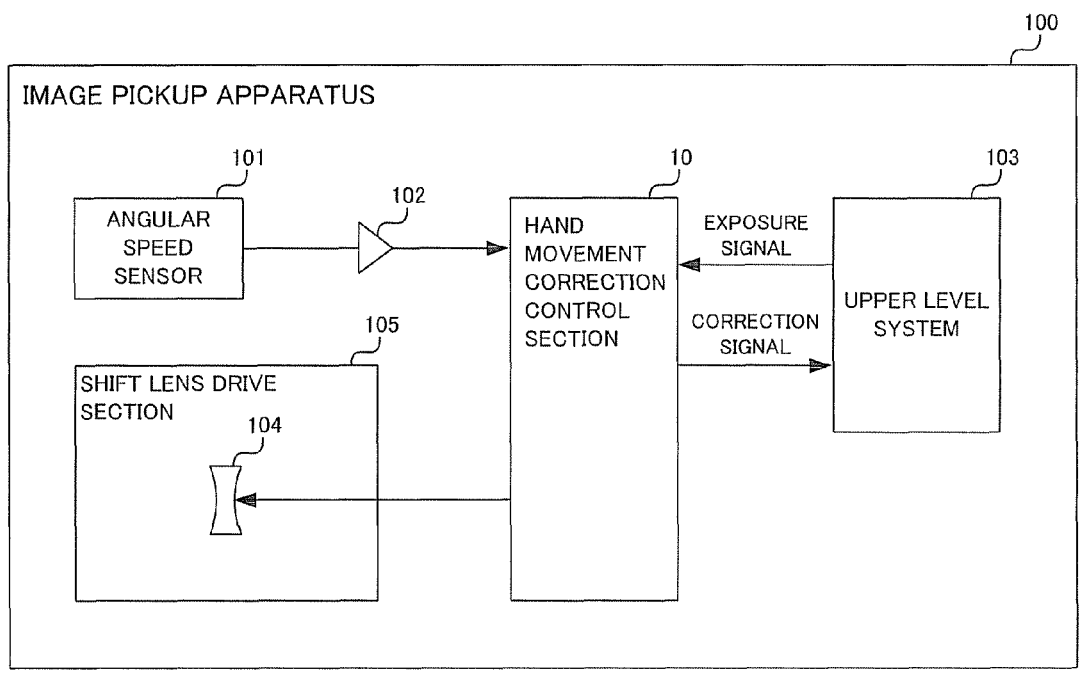
FIG. 1 is a block diagram showing a configuration of an image pickup apparatus according to an embodiment of the present invention.

A configuration of an image pickup apparatus according to the present embodiment will first be described. FIG. 1 is a block diagram showing a configuration of the image pickup apparatus according to the present embodiment.

An image pickup apparatus 100 includes an angular speed sensor 101 for detecting a rotation angular speed, and an angular speed sensor amplifier 102 for amplifying an angular speed signal output from the angular speed sensor 101. The image pickup apparatus 100 further includes a hand movement correction control section 10 (hand movement correction apparatus) that calculates a hand movement correction amount based on the angular speed signal output from the angular speed sensor 101 and outputs, to an upper level system, a correction signal indicating that hand movement correction is being performed. The image pickup apparatus 100 further includes an upper level system 103 that outputs, to the hand movement correction control section 10, an exposure signal which is set to HIGH level during exposure time and set to LOW level except during exposure time. The image pickup apparatus 100 further includes a shift lens drive section 105 (drive section) that drives a shift lens 104 (optical system) provided therein in the direction canceling a position variation caused by hand movement based on the hand movement correction amount calculated by the hand movement correction control section 10. The image pickup apparatus 100 is a digital still camera, and the upper level system 103 has a display for displaying a finder image as a moving picture.

Operation of the image pickup apparatus 100 in the present embodiment will next be described.

The angular speed sensor 101 detects a rotation angular speed corresponding to the movement caused by hand movement as an angular speed signal, and the angular speed sensor amplifier 102 amplified the detected angular speed signal. The hand movement correction control section 10 calculates a hand movement correction amount based on the amplified angular speed signal and outputs the calculated hand movement correction amount to the shift lens drive section 105. The shift lens drive section 105 drives the shift lens 104 based on the input hand movement correction amount. Further, the hand movement correction control section 10 switches the hand movement correction amount to be output to the shift lens drive section 105 based on the exposure signal output from the upper level system 103.

Upon reception of the correction signal, the upper level signal 103 displays, on the display, information indicating that correction is effective. This information is displayed only when a gain calculated by a gain controller 12 to be described later is more than a predetermined value. This information may be notified to a photographer by any means, such as blinking of an LED, as long as it can notify the photographer of the information indicating that correction is effective.

Figure 2:
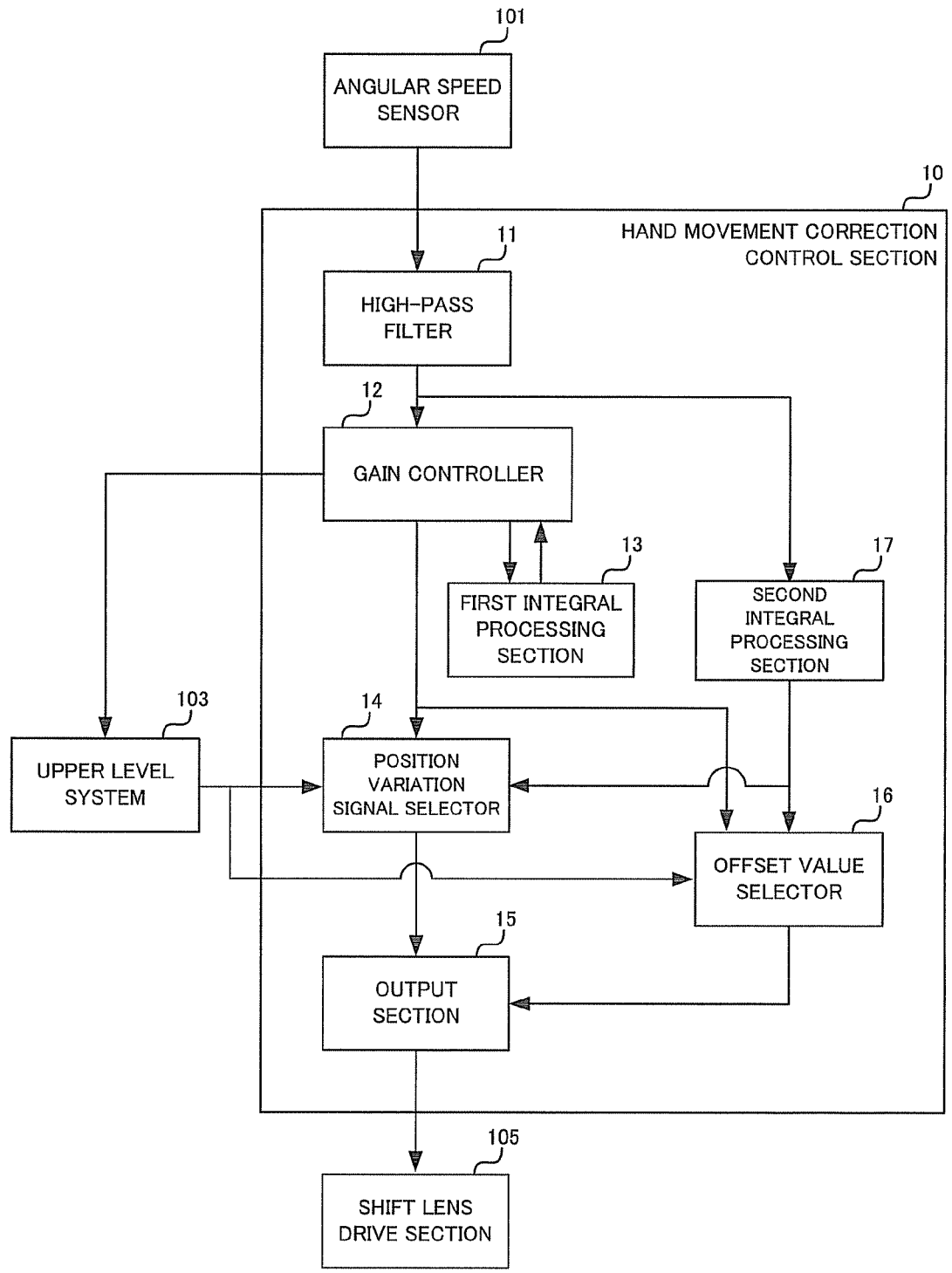
FIG. 2 is a block diagram showing a configuration of a hand movement correction control section.

A configuration of the hand movement correction control section of the image pickup apparatus will next be described. FIG. 2 is a block diagram showing a configuration of the hand movement correction control section.

The hand movement correction control section 10 of the image pickup apparatus 100 according to the present embodiment includes a high-pass filter 11, a gain controller 12, a first integral processing section 13 (position variation signal acquisition section), a second integral processing section 17 (position variation signal acquisition section), a position variation signal selector 14 (exposure determination section, position variation signal switching section), an output section 15 (hand movement correction amount calculation section), and an offset value selector 16 (offset value calculation section).

The high-pass filter 11 applies high-pass filtering to the angular speed signal (which has been amplified by the angular speed sensor amplifier 102) output from the angular speed sensor 101 to remove a direct current component from the angular speed signal. The gain controller 12 performs gain control of the angular speed signal to be input to the first integral processing section 13 to be described later and a position variation signal output from the first integral processing section 13 and outputs a correction signal to the upper level system 103 during the gain control operation. The first and second integral processing sections 13 and 17 perform the same integral processing for the angular speed signal input thereto to convert the angular speed signals into position data (position variation signals). The position variation signal selector 14 selects either a position variation signal that has been subjected to gain control or a position variation signal that has not been subjected to gain control based on an exposure signal output from the upper level signal 103. The offset value selector 16 selects a desired offset value based on the exposure signal output from the upper level system 103. The output section 15 calculates a hand movement correction value based on a value obtained by applying subtraction to the position variation signal selected by the position variation signal selector 14 using the offset value selected by the offset value selector 16.

Figure 3:
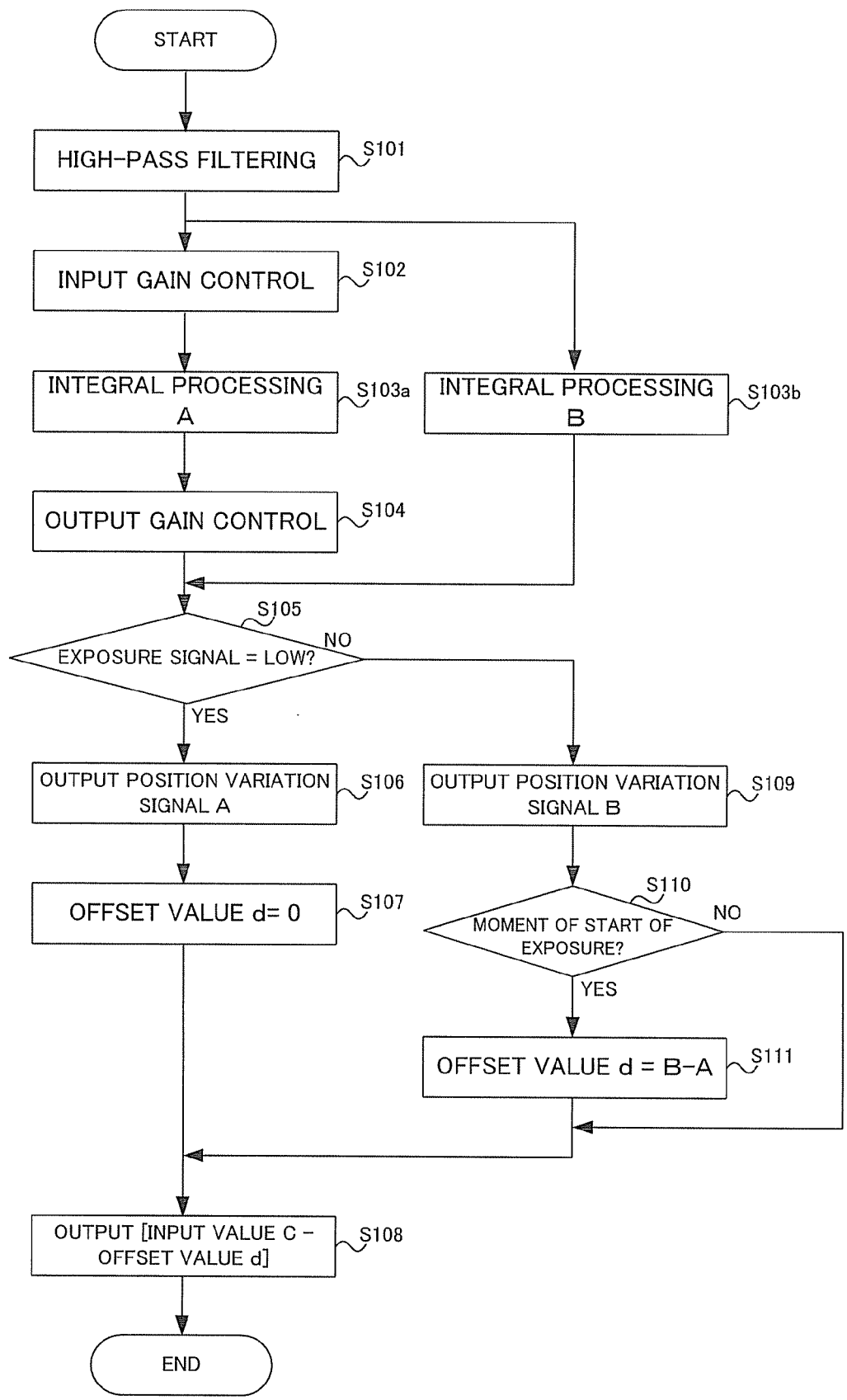
FIG. 3 is a flowchart showing operation of the hand movement correction control section.
Figure 4:
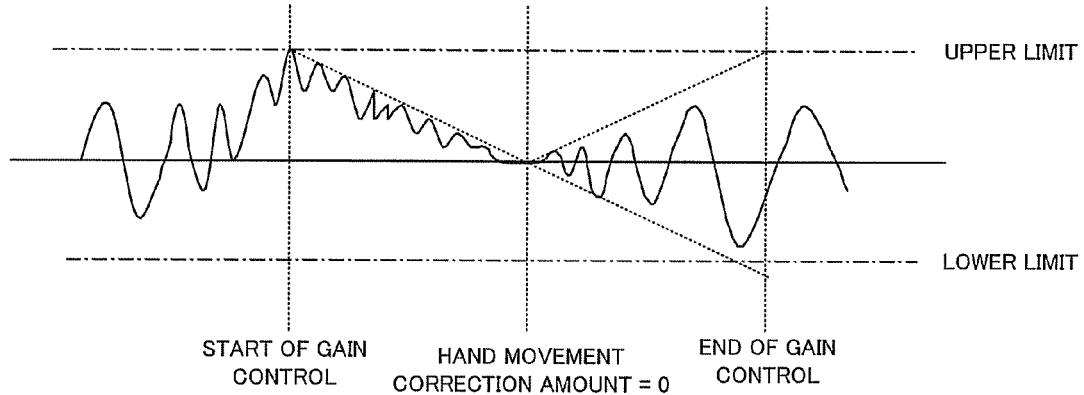
FIG. 4 is a time chart showing a fluctuation signal which has been subjected to gain control.
Figure 5:
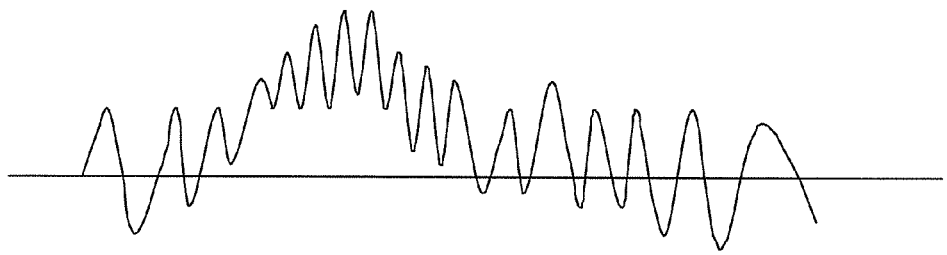
FIG. 5 is a time chart showing a fluctuation signal which is subjected to gain control.
Figure 6:
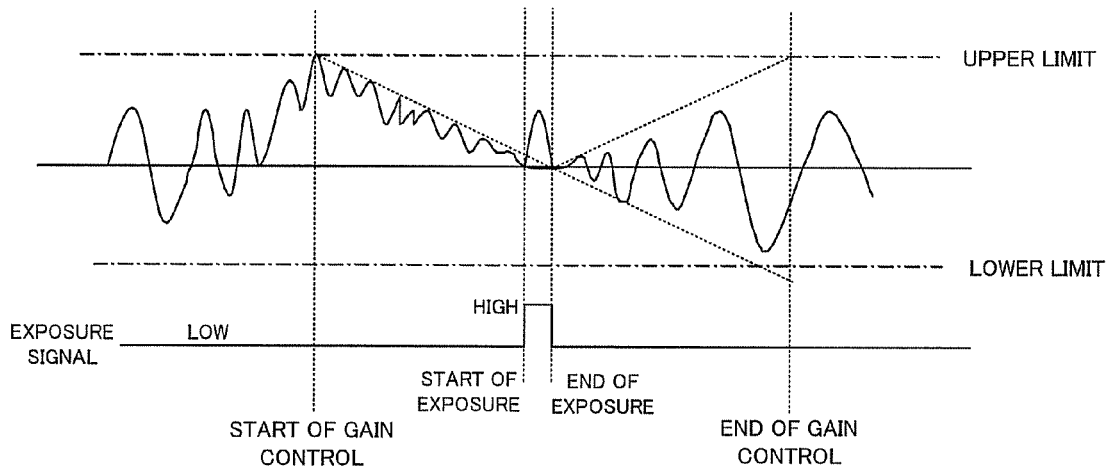
FIG. 6 is a time chart showing a position variation signal switched based on an exposure signal.

Operation of the hand movement correction control section will next be described. FIG. 3 is a flowchart showing operation of the hand movement correction control section. FIGS. 4 to 6 show time charts. FIG. 4 is a time chart showing a position variation signal that has been subjected to gain control. FIG. 5 is a time chart showing a position variation signal that is not subjected to gain control. FIG. 6 is a time chart showing a position variation signal switched based on the exposure signal. In FIGS. 4 to 6, the horizontal axis represents time, and vertical axis represents a position variation.

As shown in FIG. 3, the high-pass filter 11 of the hand movement correction control section 10 applies high-pass filtering to the input angular speed signal and outputs the resultant angular speed signal to the gain controller 12 and second integral processing section 17 (S101). The gain controller 12 performs input gain control for reducing the gain of the angular speed signal during a time period during which it detects an excessive level (level larger than a predetermined level) of the input angular speed signal and outputs the gain controlled angular speed signal to the first integral processing section 13 (S102).

The first integral processing section 13 executes integral processing for the angular speed signal input thereto from the gain controller 12 to convert the angular speed signal to a position variation signal (hereinafter, referred to "position variation signal A") and outputs the position variation signal A to the gain controller 12 (S103a, position variation acquisition step). At the same timing, the second integral processing section 17 executes integral processing for the angular speed signal input thereto from the high-pass filter 11 to convert the angular speed signal to a position variation signal (hereinafter, referred to "position variation signal B") and outputs the position variation signal B to the position variation signal selector 14 and offset value selector 16 (S103b, position variation signal acquisition step).

Upon reception of the position variation signal A, the gain controller 12 performs output gain control for the input position variation signal A. That is, when the variation in the position variation signal A exceeds a predetermined threshold value, the gain controller 12 reduces the gain of the position variation signal A and outputs the gain controlled position variation signal A to the position variation signal selector 14 and offset value selector 16 (S104, gain control step).

The position variation signals A and B input to the position variation signal selector 14 will here be described. As shown in FIG. 4, in order to reduce unnatural feeling of a finder image in pan/tilt operation, the gain of the position variation signal A is reduced to 0 by the gain controller 12 according to a predetermined time constant when the variation in the position variation signal A reaches a predetermined threshold (upper limit value and lower limit value in FIG. 4) and is afterward increased to its original value according to a predetermined time constant. The predetermined threshold value is assumed to be a value falling within the movable range of the shift lens 104 driven by the shift lens drive section 105.

The position variation signal B is, as shown in FIG. 5, an original position variation signal that has not been subjected to gain control at all.

The position variation signal selector 14 and offset value selector 16 determines whether the exposure signal input thereto from the upper level system is LOW (S105, exposure determination step).

When the exposure signal is LOW (YES in S105), the position variation signal selector 14 selects the position variation signal A from options (position variation signal A and position variation signal B) and outputs it as an input value C to the output section 15 (S106), and the offset value selector 16 selects 0 from options (0 and value obtained by subtracting position variation signal A from position variation signal B) and outputs it as an offset value d to the output section 15 (S107).

The output section 15 that has acquired the input value C and offset value d outputs, to the shift lens drive section 105, a value obtained by subtracting the offset value d from the input value C as a hand movement correction amount (S108, hand movement correction amount calculation step).

On the other hand, when the exposure signal is HIGH (NO in S105), the position variation signal selector 14 selects the position variation signal B from options (position variation signal A and position variation signal B) and outputs it as an input value C to the output section 15 (S109, position variation signal switching step), and the offset value selector 16 determines whether this is the moment of the start of exposure, i.e., the moment at which the exposure signal is switched from LOW to HIGH (S110).

When this is the moment of the start of exposure (YES in S110), the offset value selector 16 selects a value obtained by subtracting position variation signal A from position variation signal B from options (0 and value obtained by subtracting position variation signal A from position variation signal B) and outputs it as an offset value d to the output section 15 (S111, offset value calculation step).

The output section 15 that has acquired the input value C and offset value d outputs, to the shift lens drive section 105, a value obtained by subtracting the offset value d from the input value C as a hand movement correction amount (S108, hand movement correction amount calculation step).

On the other hand, when this is not the moment of the start of exposure (NO in S110), the output section 15 outputs, to the shift lens drive section 105, a value obtained by subtracting the offset d valued that has previously been acquired from the input value C as a hand movement correction amount (S108, hand movement correction amount calculation step).

As described above, when the position variation signal A is switched to the position variation signal B, the position variation signal B is offset by a value obtained by subtracting the position variation signal A from the position variation signal B at the moment of the start of exposure. Therefore, the position variation at the moment of the start of exposure assumes the value of the position variation signal A, whereby the correction amount can be switched without unnatural feeling. Further, a value set at the moment of the start of exposure is retained as the value of the offset value d and thereby the offset position variation signal B is output during exposure.

With the configuration and operation described above, the position variation signal output from the output section 15 to the shift lens drive section 105 is switched to the position variation signal B only during exposure as shown in FIG. 6, whereby hand movement correction can be made in still image pickup operation even if gain control has been performed for the position variation signal (position variation signal A).

Further, by setting the threshold value employed in the gain controller 12 to a value falling within the movable range of the shift lens 104 driven by the shift lens drive section 105, a possibility that the variation exceeds the movable range of the shift lens 104 driven by the shift lens drive section 105 after the position variation signal A has been switched to the position variation signal B can be reduced.

Further, the configuration in which the upper level system 103 displays, on the display, information indicating that the hand movement correction is effective when receiving the correction signal input thereto from the hand movement correction control section 10 allows the photographer to be aware of whether hand movement correction is effective or not, thereby increasing the success rate of image pickup operation.

Although hand movement is corrected by driving an image pick device such as the shift lens 104 in the present embodiment, the present invention is not limited to this but any correction method may be employed as long as it corrects hand movement by moving the position of a specific member in accordance with the direction and amount of the hand movement.

In the present embodiment, there has been explained the case where a hand movement correction program and an image pickup program allowing a computer to execute the function for implementing the present invention are previously stored inside the apparatus, but the present invention is not limited thereto, and a similar function may be downloaded from the network into the apparatus or a recording medium on which a similar function is stored may be installed in the apparatus. The recording medium may be any form of recording medium such as CD-ROM which can store programs and is readable by the apparatus. The function which can be previously obtained through installing or downloading may be realized in cooperation with the OS (operating system) inside the apparatus.

Although an exemplary embodiment of the present invention has been shown and described, it will be apparent to those having ordinary skill in the art that a number of changes, modifications, or alterations to the invention as described herein may be made within the spirit and scope of the present invention.

What is claimed is:

1. A hand movement correction apparatus for correcting hand movement in an image pickup apparatus, comprising:
    a position variation signal acquisition section that acquires a position variation signal representing the movement of the image pickup apparatus;
    a first integral processing section that calculates a first position variation signal by integrating the position variation signal acquired by the position variation signal acquisition section;
    a second integral processing section that calculates a second position variation signal by integrating the position variation signal acquired by the position variation signal acquisition section;
    a gain controller that controls the first position variation signal according to a predetermined time constant in order that a variation amount of the controlled first position variation signal falls within a range defined by an upper limit and a lower limit in case a variation amount of the calculated first position variation signal reaches the upper limit value or the lower limit value;
    an exposure determination section that determines whether exposure operation is in progress in the image pickup apparatus;
    a position variation signal outputting section that outputs the controlled first position variation signal in the case where it is determined by the exposure determination section that the exposure operation is not in progress in the image pickup apparatus, and outputs the second position variation signal in the case where it is determined by the exposure determination section that the exposure operation is in progress in the image pickup apparatus; and
    a hand movement amount calculation section that calculates a hand movement correction amount based on one of the controlled first position variation signal and the second position variation outputted from the position variation signal outputting section.

2. The hand movement correction apparatus according to claim 1, further comprising:
    an offset value calculation section that outputs, as an offset value, a value obtained by subtracting the value of the first position variation signal that has been subjected to gain control by the gain controller at the start timing of exposure in the image pickup apparatus determined by the exposure determination section from the value of the second position variation signal at the exposure start timing, wherein,
    in the case where it has been determined by the exposure determination section that the exposure operation is in progress in the image pickup apparatus, the hand movement correction amount calculation section calculates the hand movement correction amount based on a position variation signal obtained by subtracting the offset value output from the offset value calculation section from the second position variation signal outputted from the position variation signal outputting section.

3. A non-transitory medium storing, in a computer readable manner, a hand movement correction program for correcting hand movement in an image pickup apparatus,
    the hand movement correction program allowing a computer to execute:
    a position variation signal acquisition step that acquires a position variation signal representing the movement of the image pickup apparatus;
    a first integral processing step that calculates a first position variation signal by integrating the position variation signal acquired by the position variation signal acquisition step;
    a second integral processing step that calculates a second position variation signal by integrating the position variation signal acquired by the position variation signal acquisition step;
    a gain control step that controls the first position variation signal according to a predetermined time constant in order that a variation amount of the controlled first position variation signal falls within a range defined by an upper limit and a lower limit in case a variation amount of the calculated first position variation signal reaches the upper limit value or the lower limit value;
    an exposure determination step that determines whether exposure operation is in progress in the image pickup apparatus;
    a position variation signal outputting step that outputs the controlled first position variation signal in the case where it is determined by the exposure determination step that the exposure operation is not in progress in the image pickup apparatus, and outputs the second position variation signal in the case where it is determined by the exposure determination step that the exposure operation is in progress in the image pickup apparatus; and a hand movement amount calculation step that calculates a hand movement correction amount based on one of the controlled first position variation signal and the second position variation outputted from the position variation signal outputting step.

4. The non-transitory medium according to claim 3, wherein the hand movement correction program further allows the computer to execute:

an offset value calculation step that outputs, as an offset value, a value obtained by subtracting the value of the first position variation signal that has been subjected to gain control by the gain control step at the start timing of exposure in the image pickup apparatus determined by the exposure determination step from the value of the second position variation signal at the exposure start timing, and in the case where it has been determined by the exposure determination step that the exposure operation is in progress in the image pickup apparatus, the hand movement correction amount calculation step calculates the hand movement correction amount based on a position variation signal obtained by subtracting the offset value output by the offset value calculation step from the second position variation signal outputted by the position variation signal outputting step.

5. An image pickup apparatus that performs correction of hand movement, comprising:

an image pickup device;

an optical system that guides light to the image pickup device;

a position variation signal acquisition section that acquires a position variation signal representing the movement of the image pickup apparatus;

a first integral processing section that calculates a first position variation signal by integrating the position variation signal acquired by the position variation signal acquisition section;

a second integral processing section that calculates a second position variation signal by integrating the position variation signal acquired by the position variation signal acquisition section;

a gain controller that controls the first position variation signal according to a predetermined time constant in order that a variation amount of the controlled first position variation signal falls within a range defined by an upper limit and a lower limit in case a variation amount of the calculated first position variation signal reaches the upper limit value or the lower limit value;

an exposure determination section that determines whether exposure operation is in progress in the image pickup apparatus;

a position variation signal outputting section that outputs the controlled first position variation signal in the case where it is determined by the exposure determination section that the exposure operation is not in progress in the image pickup apparatus, and outputs the second position variation signal in the case where it is determined by the exposure determination section that the exposure operation is in progress in the image pickup apparatus;

a hand movement amount calculation section that calculates a hand movement correction amount based on one of the controlled first position variation signal and the second position variation outputted from the position variation signal outputting section; and a drive section that drives at least one of the optical system and image pickup device based on the hand movement correction amount calculated by the hand movement correction amount calculation section.

6. The image pickup apparatus according to claim 5, further comprising:

an offset value calculation section that outputs, as an offset value, a value obtained by subtracting the value of the first position variation signal that has been subjected to gain control by the gain controller at the start timing of exposure in the image pickup apparatus determined by the exposure determination section from the value of the second position variation signal at the exposure start timing, wherein, in the case where it has been determined by the exposure determination section that the exposure operation is in progress in the image pickup apparatus, the hand movement correction amount calculation section calculates the hand movement correction amount based on a position variation signal obtained by subtracting the offset value output from the offset value calculation section from the second position variation signal outputted from the position variation signal outputting section.

7. A non-transitory medium storing, in a computer readable manner, an image pickup program for correcting hand movement in an image pickup apparatus provided with an image pickup device and an optical system that guides light to the image pickup device, the image pickup program allowing a computer to execute:

a position variation signal acquisition step that acquires a position variation signal representing the movement of the image pickup apparatus;

a first integral processing step that calculates a first position variation signal by integrating the position variation signal acquired by the position variation signal acquisition step;

a second integral processing step that calculates a second position variation signal by integrating the position variation signal acquired by the position variation signal acquisition step;

a gain control step that controls the first position variation signal according to a predetermined time constant in order that a variation amount of the controlled first position variation signal falls within a range defined by an upper limit and a lower limit in case a variation amount of the calculated first position variation signal reaches the upper limit value or the lower limit value;

an exposure determination step that determines whether exposure operation is in progress in the image pickup apparatus;

a position variation signal outputting step that outputs the controlled first position variation signal in the case where it is determined by the exposure determination step that the exposure operation is not in progress in the image pickup apparatus, and outputs the second position variation signal in the case where it is determined by the exposure determination step that the exposure operation is in progress in the image pickup apparatus;

a hand movement amount calculation step that calculates a hand movement correction amount based on one of the controlled first position variation signal and the second position variation outputted from the position variation signal outputting step; and a drive step that drives at least one of the optical system and image pickup device based on the hand movement correction amount calculated by the hand movement correction amount calculation step.

8. The non-transitory medium according to claim 7, wherein
the image pickup program further allows the computer to execute:
an offset value calculation step that outputs, as an offset value, a value obtained by subtracting the value of the first position variation signal that has been subjected to gain control by the gain control step at the start timing of exposure in the image pickup apparatus determined by the exposure determination step from the value of the second position variation signal at the exposure start timing, and
in the case where it has been determined by the exposure determination step that the exposure operation is in progress in the image pickup apparatus, the hand movement correction amount calculation step calculates the hand movement correction amount based on a position variation signal obtained by subtracting the offset value output by the offset value calculation step from the second position variation signal outputted by the position variation signal outputting step.

* * * * *